United States Patent [19]
Daugherty et al.

[11] Patent Number: 4,781,883
[45] Date of Patent: Nov. 1, 1988

[54] SPENT FUEL STORAGE CASK HAVING CONTINUOUS GRID BASKET ASSEMBLY

[75] Inventors: David A. Daugherty; Nicholas J. Georges; Harry E. Flanders, Jr.; Octavio J. Machado, all of Pensacola, Fla.

[73] Assignee: Westinghouse Electric Corp., Pittsburgh, Pa.

[21] Appl. No.: 75,191

[22] Filed: Jul. 17, 1987

Related U.S. Application Data

[63] Continuation of Ser. No. 646,722, Sep. 4, 1984, abandoned.

[51] Int. Cl.$^4$ ............................................. G21F 5/00
[52] U.S. Cl. ............................... 376/272; 250/507.1
[58] Field of Search .......................... 376/272, 462; 250/507.1, 506.1

[56] References Cited

U.S. PATENT DOCUMENTS

| | | | |
|---|---|---|---|
| 3,466,445 | 9/1969 | Schlies | 376/272 |
| 3,667,540 | 6/1972 | Kupp | 376/272 |
| 3,732,427 | 5/1973 | Trudeau | 376/272 |
| 3,780,306 | 12/1973 | Anderson | 376/272 |
| 3,859,533 | 1/1975 | Suvantor | 376/272 |
| 4,096,392 | 6/1978 | Rubinstein | 376/272 |
| 4,152,602 | 5/1979 | Kaminski | 376/272 |
| 4,243,889 | 1/1981 | Weber | 376/272 |

FOREIGN PATENT DOCUMENTS

| | | |
|---|---|---|
| 82317 | 6/1983 | European Pat. Off. . |
| 2943085A1 | 5/1981 | Fed. Rep. of Germany . |
| 3222822A1 | 12/1983 | Fed. Rep. of Germany . |
| 2384327 | 10/1978 | France . |
| 2424610 | 11/1979 | France . |

OTHER PUBLICATIONS

"Spent Fuel Consolidation Demonstration" (Fall, 1982), 10 pages.

*Primary Examiner*—Kurt Rowan

[57] ABSTRACT

A spent fuel storage cask for long-term storage of spent nuclear fuel following short-term storage in a pool of water. The cask includes a grid basket assembly, resembling a matrix of pigeonholes, for accommodating cells which in turn accommodate spent fuel assemblies. The grid basket assembly is formed by metal plates which transmit heat to channel sections affixed to the interior walls of the cask. The edges of the plates movably fit into the channel sections in order to permit radial movement of the grid basket assembly with respect to the walls of the cask as temperature changes. During storage the cask can be flooded with helium, which readily transmits heat through narrow gaps between the edges of the plates and the walls of the channel sections. Several embodiments of cells having material for moderating neutrons emitted from spent fuel assemblies are also enclosed, some of these embodiments permitting easy conversion of the cask for storing consolidated fuel rather than intact fuel assemblies.

27 Claims, 13 Drawing Sheets

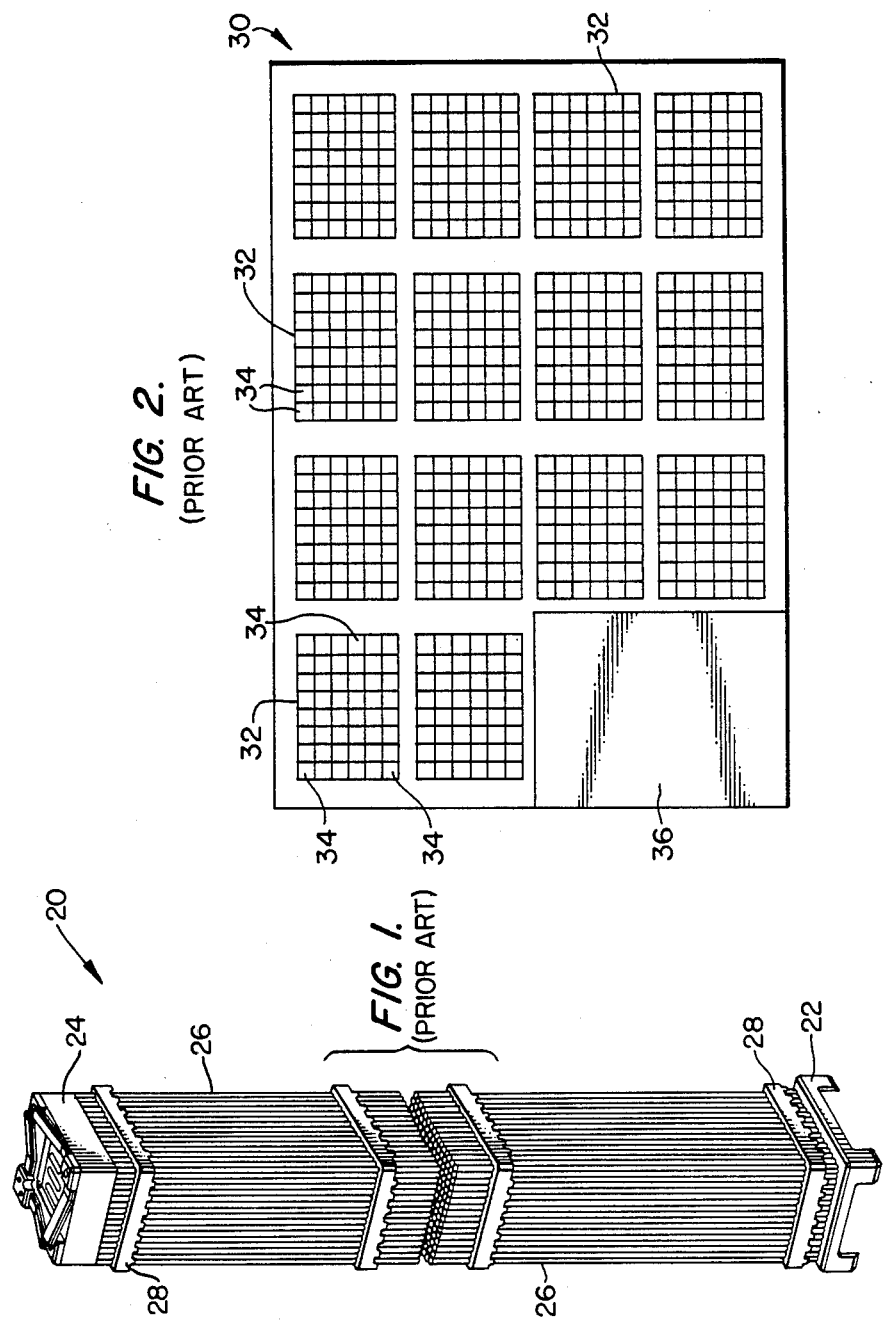

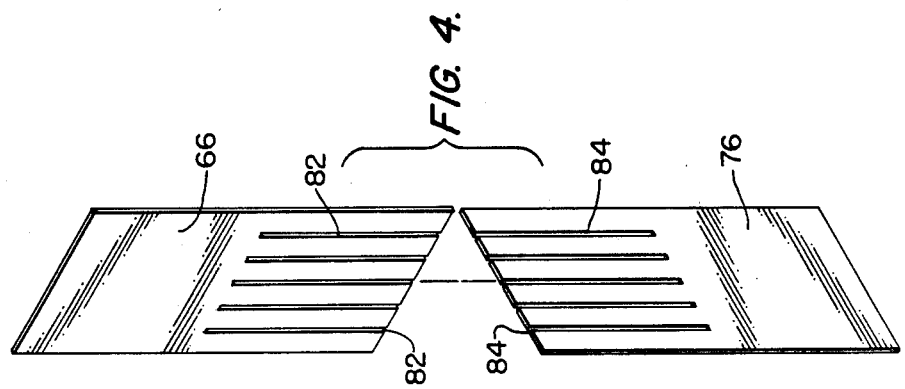
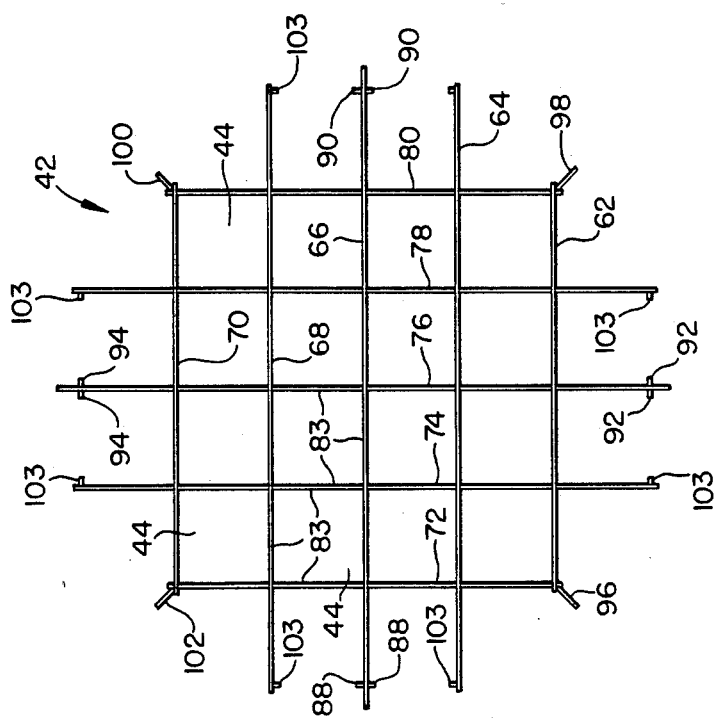

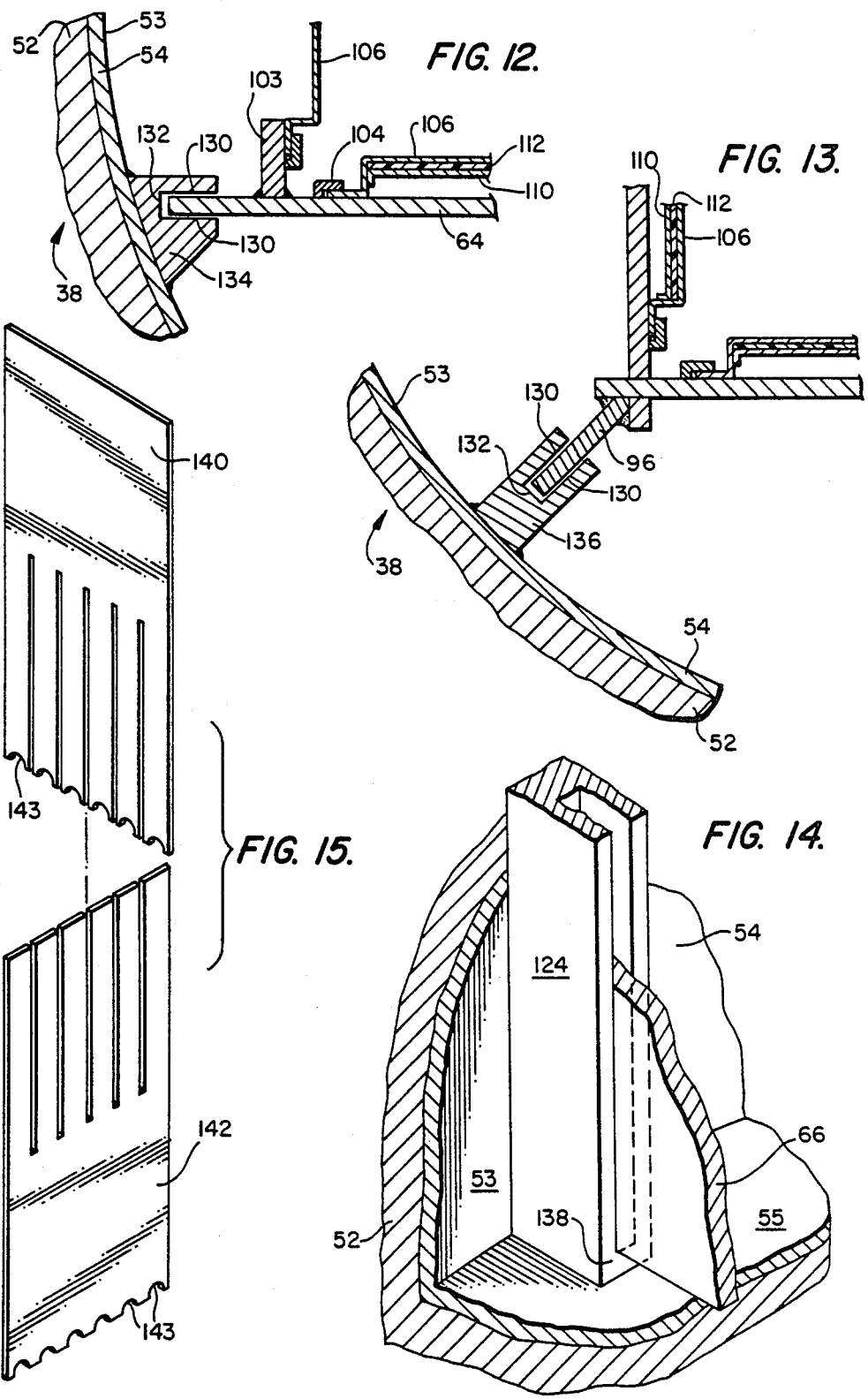

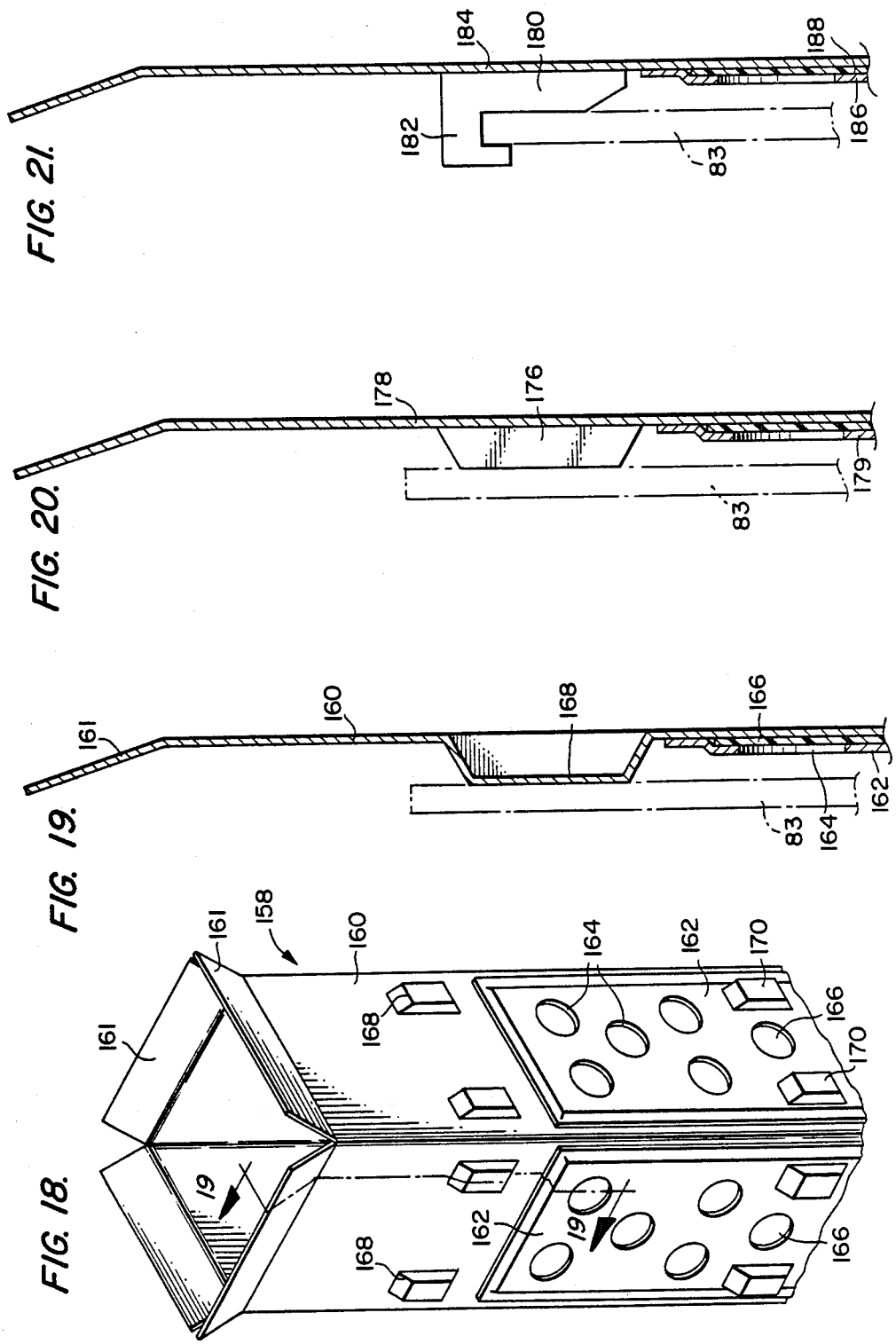

SPENT FUEL STORAGE CASK HAVING CONTINUOUS GRID BASKET ASSEMBLY

This application is a continuation of application Ser. No. 06/646,722 filed Sept. 4, 1984, now abandoned.

BACKGROUND OF THE INVENTION

The present invention is related to the longterm storage of spent fuel that has been removed from a nuclear reactor, and more particularly, to a spent fuel storage cask having a continuous grid basket assembly which supports the spent fuel and which dissipates heat generated by the spent fuel.

FIG. 1 illustrates a typical fuel assembly 20 for supplying nuclear fuel to a reactor. Assembly 20 includes a bottom nozzle 22 and a top nozzle 24, between which are disposed elongated fuel rods 26. Each fuel rod 26 includes a cylindrical housing made of a zirconium alloy such as commerically available "Zircalloy-4", and is filled with pellets of fissionable fuel enriched with U-235. Within the assembly of fuel rods 26, tubular guides (not shown) are disposed between nozzles 22 and 24 to accommodate movably mounted control rods (not illustrated) and measuring instruments (not illustrated). The ends of these tubular guides are attached to nozzles 22 and 24 to form a skeletal support for fuel rods 26, which are not permanently attached to nozzles 22 and 24. Grid members 28 have apertures through which fuel rods 26 and the tubular guides extend to bundle these elements together. Commerically available fuel assemblies for pressurized water reactors include between 179 and 264 fuel rods, depending upon the particular design. A typical fuel assembly is about 4.1 meters long, about 19.7 cm wide, and has a mass of about 585 kg., but it will be understood that the precise dimensions vary from one fuel assembly design to another.

After a service life of about 3 years in a pressurized water reactor, the U-235 enrichment of a fuel assembly 20 is depleted. Furthermore, a variety of fission products, having various half-lives, are present in rods 26. These fission products generate intense radioactivity and heat when assemblies 20 are removed from the reactor, and accordingly the assemblies 20 are moved to a pool containing boron salts dissolved in water (hereinafter "borated water") for short-term storage. Such a pool is designated by reference number 30 in FIG. 2.

Pool 30 is typically 12.2 meters deep. A number of spent fuel racks 32 positioned at the bottom of pool 30 are provided with storage slots 34 to vertically accommodate fuel assemblies 20. A cask pad 36 is located at the bottom of pool 30.

During the period when fuel assemblies 20 are stored in pool 30, the composition of the spent fuel in rods 26 changes. Isotopes with short half-lives decay, and consequently the proportion of fission products having relatively long half-lives increases. Accordingly, the level of radioactivity and heat generated by a fuel assembly 20 decreases relatively rapidly for a period and eventually reaches a state wherein the heat and radioactivity decrease very slowly. Even at this reduced level, however, rods 26 must be reliably isolated from the environment for the indefinite future.

Dry storage casks provide one form of long-term storage for the spent fuel. After the heat generated by each fuel assembly 20 falls to a predetermined amount—such as 0.5 to 1.0 kilowatt per assembly, after perhaps 10 years of storage in pool 30—an opened cask is lowered to pad 36. By remote control the spent fuel is tranferred to the cask, which is then sealed and drained of borated water. The cask can then be removed from pool 30 and transported to an above-ground storage area for long-term storage.

The requirements which must be imposed on such a cask are rather severe. The cask must be immune from chemical attack during long-term storage. Furthermore, it must be sufficiently rugged mechanically to avoid even tiny ruptures or fractures during long-term storage and during transportation, when the cask might be subjected to rough treatment or accidents such as drops. Moreover, the cask must be able to transmit heat generated by the spent fuel to the environment while nevertheless shielding the environment from radiation generated by the spent fuel. The temperature of the rods 26 must be kept below a maximum temperature, such as 375° C., to prevent deterioration of the zirconium alloy housing. Provisions must also be made to ensure that a chain reaction cannot be sustained within the cask; that is, that the effective criticality factor $K_{eff}$ remains less than one so that a self-sustaining reaction does not occur. These requirements impose stringent demands upon the cask, which must fulfill its storage function in an utterly reliable manner.

SUMMARY OF THE INVENTION

Accordingly, one object of the present invention is to provide a mechanically rugged storage cask which prevents fission products and radiation from escaping into the environment while dissipating heat generated by spent fuel.

Another object of the present invention is to provide a storage cask which is sufficiently versatile to accomodate spent fuel in various different forms, including fuel assemblies having different dimensions and fuel in consolidated form, and to store different forms of spent fuel simultaneously.

Another object of the present invention is to provide a storage cask having a grid basket assembly for supporting spent fuel and for conducting heat generated thereby to the walls of the cask.

Another object of the present invention is to provide cell assemblies for use in cooperation with the grid basket assembly when spent fuel assemblies are stored.

Another object of the present invention is to provide a storage cask wherein heat is transmitted from the grid basket assembly to channel sections affixed to the inner walls of the cask via thin gaps between the channel sections and the edges of the elements forming the grid basket assembly, the channel sections additionally permitting movement of the grid basket assembly with respect to the walls of the cask during temperature variations.

These and other objects can be attained by providing a container having a grid basket assembly which includes a plurality of metal plates joined together to provide a matrix of storage slots for the spent fuel, and elongated channel sections which are affixed to the inside walls of the container and which accommodate the edges of the plates in order to transmit heat from the grid basket assembly to the walls of the container without preventing relative movement between the grid basket assembly and the walls. In accordance with one aspect of the invention, the metal plates of the grid basket assembly provide elongated storage slots having generally rectangular cross sections, and consolidation canisters or cells having walls which include neutron moderating material are mounted in the storage slots. Such cells accommodate spent fuel assemblies and can be individually configured in accordance with the dimensions of the fuel assemblies which they are to receive. Each cell can include four panel portions which are affixed to the walls of the storage slots by tabs. Alternatively, the cells may include shell elements which have wall portions that are spaced apart from the walls of the storage slots and corner poritons that project outward to contact the walls of the storage slots. In other embodiments, the cells may include shell elements having walls which provide substantially rectangular cross sections, with spacer elements being provided in the form of dimples in the shells or spacer members affixed to the shells. Regardless of the cell embodiment, at least some of the walls of the cells include sheets of boron carbide or other "neutron poison" supported by wrapper elements, which may include apertures to permit visual confirmation that neutron poison is present and to facilitate drainage of borated water when spent fuel is being loaded into the cask. A consolidation canister containing fuel rods, instead of a cell for receiving a fuel assembly, is deposited in a storage slot if the slot is to be used for storage of fuel in consolidated form.

In accordance with another aspect of the invention, the grid basket assembly is supported above the floor of the container in order to facilitate drainage of borated water. This may be accomplished by providing cut-outs at the lower ends of the plates forming the grid basket assembly, by terminating the channels of the channel sections above the floor of the container in order to support the plates above the floor, or by providing support elements disposed between the floor of the container and the lower ends of the plates of the grid basket assembly. These support elements can have flanges which are positioned to permit consolidation canisters to rest on the cask floor but to support the lower ends of the cells. Alternatively, the cells can be mechanically attached to the grid assembly at one region so that the cells can move with respect to the grid basket assembly at other places as temperature changes, or hooks can be provided at the upper ends of the cells in order to hang the cells from the plates of the grid basket assembly.

The grid basket assembly is preferably fabricated by making slots from the bottom to the middle of a first set of plates, making corresponding slots from the top to the middle of a second set of plates, and interdigitating the plates to provide a matrix of elongated storage slots having rectangular cross sections.

BRIEF DESCRIPTION OF THE DRAWINGS

FIG. 1 is a perspective view of a typical fuel assembly;

FIG. 2 is a top plan view of a pool for short-term storage of spent fuel assemblies;

FIG. 3 is a top plan view of a grid basket assembly;

FIG. 4 is an exploded perspective view illustrating how two plates of the grid basket assembly fit together;

FIG. 12 is a detailed view illustrating another of the channel sections of FIG. 10 cooperating with the edge of a plate of the grid basket assembly;

FIG. 13 is a detailed view of another of the channel sections illustrated in FIG. 10 cooperating with the edge of a plate of the grid basket assembly;

FIG. 14 is a perspective view of the bottom portion of a channel section having a channel that terminates above the floor of the cask in order to elevate the plates of the grid basket assembly to facilitate drainage;

FIG. 15 is a perspective view of two plates in the grid basket assembly with drainage cut-outs to facilitate drainage;

FIG. 18 is a perspective view of the top portion of another embodiment of a cell;

FIG. 19 is a sectional view, taken along the line 19—19 of FIG. 18;

FIG. 20 is a sectional view illustrating a modification of the embodiment of FIG. 18;

FIG. 21 is a sectional view illustrating a further modification of the embodiment of FIG. 18, including a hook portion which hangs the cell from the plates forming the grid basket assembly;

DESCRIPTION OF THE PREFERRED EMBODIMENTS

Figure 9:
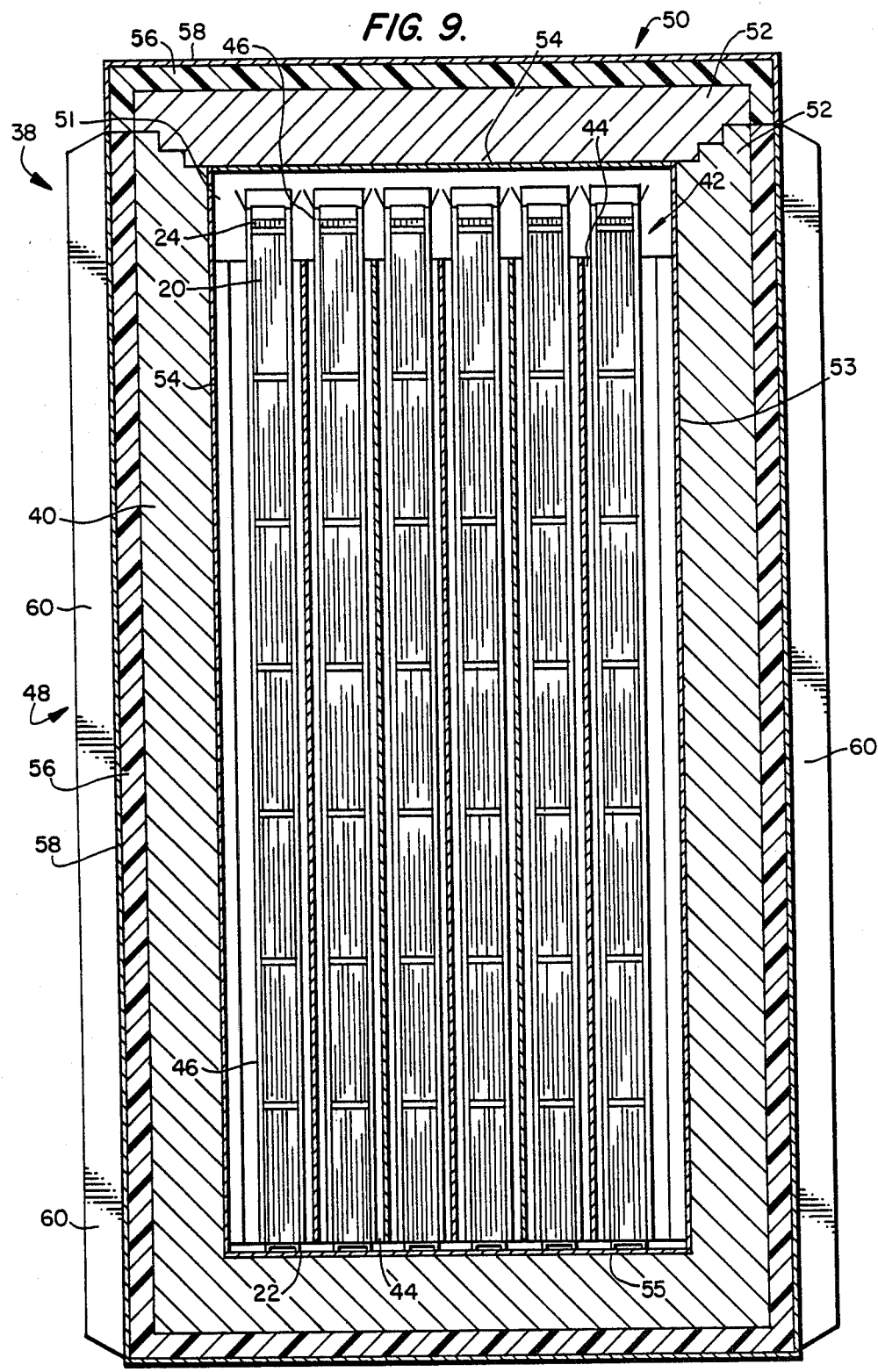
FIG. 9 is a sectional view illustrating a cask and grid basket assembly having cells installed therein for accommodating fuel assemblies.

Turning first to FIG. 9, the cask 38 of the present invention includes generally cylindrical container 40 having a grid basket assembly 42 disposed therein. Grid basket assembly 42 provides an array of storage slots 44, configured much like a matrix of vertically disposed pigeonholes, each accommodating a cell 46. The fuel assemblies 20 are placed in the cells 46 for storage.

With continuing reference to FIG. 9, container 40 includes a base element 48 having an upper portion configured to receive lid element 50. The cavity 51 provided within base element 48 has substantially cylindrical walls 53 rising from floor 55, which is substantially horizontal during long-term storage. Elements 48 and 50 include carbon steel portions 52 to which inter cladding layers 54 of stainless steel are affixed. Carbon steel portions 52 are approximately 25 cm thick and serve to protect the environment from gamma rays. Layer 54 can be applied to base element 48, for example, by placing it on a turntable and rotating it while welding a continuous spiral path around the interior using stainless steel welding rods, thereby applying a stainless steel surface while completely covers the floor 55 and side walls 53 of element 48. Outside of portions 52, elements 48 and 50 are provided with a layer about 7.0 cm thick of neutron absorbing material 56, which may be a resin. A suitable resin for use as material 56 is commercially available from Bisco Products, Inc., 1420 Renaissance Drive, Park Ridge, Ill. 60068, under Stock No. N.S.-3. Surrounding material 56 is outer layer 58 of stainless steel to protect cask 38 from the environment. Cask 38 also includes cooling fins 60 of carbon steel, preferably treated to protect the carbon steel from chemical attack by the environment. Fins 60 are welded to portion 52 and extend through material 56 and layer 58. In this embodiment, cask 38 is approximately 4.8 meters high and has an outer diameter of about 2.5 meters, excluding fins 60. When loaded with spent fuel, cask 38 has a mass of over a hundred thousand kilograms. Although not illustrated, it is advantageous to affix a pair of trunnions at the top and bottom of base element 48 to facilitate handling.

Turning now to FIG. 3, grid basket assembly 42 includes major plates 62, 64, 66, 68, 70, 72, 74, 76 78 and 80. These plates may be fabricated of aluminum sheets approximately 3.7 meters high and 2.0 cm thick. With reference to FIG. 4, the bottom portion of plate 66, for example, includes five downwardly oriented slots 82 dividing the bottom portion of plate 66 into six segments, each of these six segments forming a portion of one of the four walls 83 (FIG. 3) of a storage slot 44. In a similar manner, the upper portion of plate 76, for example, includes five upwardly extending slots 84. The slots 82 in plate 66 and the slots 84 in plate 76 are about 26.3 cm apart, and it will be apparent that such dimensions provide slots 44 which are positioned about 26.3 cm apart, center-to-center. During assembly, plates 62, 64, 66, 68 and 70 are held at right angles to plates 72, 74, 76, 78 and 80, and the slots 82 are then inserted into slots 84 to provide intersections which run the entire length of the plates. The plates are joined by full length fillet welds along opposite sides of the intersections, so that there are two welds running along each intersection. This is best illustrated in FIG. 5 where, for example, welds 86 are oppositely disposed along the intersection formed by plates 68 and 78.

Returning to FIG. 3, minor plates 88 are welded at one end of plate 66 and minor plates 90 are welded at the other end. Similarly, minor plates 92 are welded at one end of plate 76 and minor plates 94 are welded at the other end. Minor plate 96 is welded at the intersection of plates 62 and 72, minor plate 98 is welded at the intersection of plates 62 and 80, minor plate 100 is welded at the intersection of plates 80 and 70, and minor plate 102 is welded at the intersection of plates 70 and 72. Minor plates 103 are welded to plates 64, 68, 74 and 78.

Figure 6:
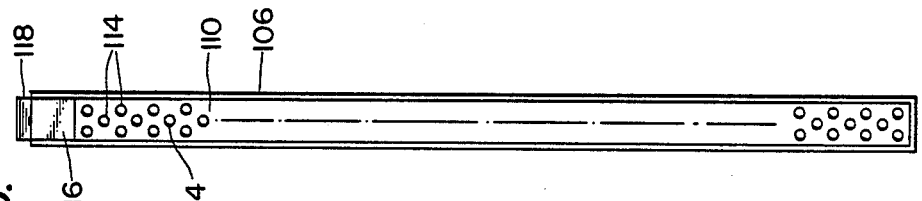
FIG. 6 is a front elevational view of one of the walls of the cell of FIG. 5.
Figure 5:
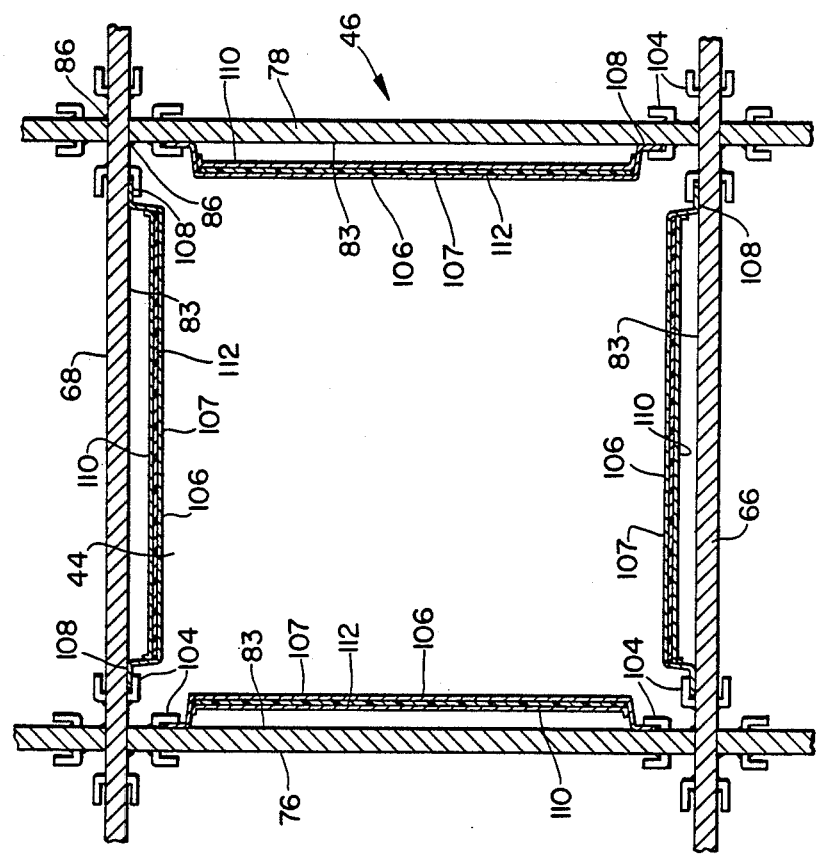
FIG. 5 is a sectional view, taken parallel to the plane of the paper of FIG. 3, illustrating a storage slot formed by the grid basket assembly and one embodiment of a cell for use with spent fuel assemblies.

Turning next to FIGS. 5 and 6, cell 46 will now be described. To support the cell panels, tabs 104 are welded to the plates adjacent the intersections. Panel portions 106, of stainless steel about 0.25 cm thick, are bent to provide cell walls 107 and flanges 108, which slidably extend beween tabs 104. During storage, walls 107 contact the sides of fuel assembly 20 to keep it positioned at a predetermined location in slot 44 in order to maintain the spacing between fuel assemblies 20. In the preferred embodiment, fuel assemblies are positioned centrally within slots 44 and, for the sake of convenience, it will be said that they are "centered" therein by walls 107, although it will be understood that this does not exclude other uniform positioning patterns. It will be apparent that the distance by which walls 107 project into slot 44 in order to center the fuel assembly is determined by the dimensions of the particular fuel assembly which the cell 46 will enclose. Stainless steel wrapper portions 110, about 0.076 cm thick, are welded to portions 106 in order to support sheets 112 of "neutron poison" such as boron carbide. Sheets 112, which are about 19 cm wide and 0.19 cm thick, are present to moderate neutrons emitted from fuel assemblies 20 when cask 38 is in pool 30 while the fuel assemblies are being loaded into it. Sheets 112 help to maintain the criticality factor $K_{eff}$ at less than 1 in order to obviate the possibility of a chain reaction. That is, the sheets 112 and the spacing limit the nuclear interaction between fuel assemblies 20, which are of course designed to promote chain reactions when they are present in a reactor. It is worth noting that sheets 112 have served their purpose after the borated water has been drained from cask 38 during the loading process, since thereafter the potential for a chain reaction is reduced. The foregoing details concerning the thickness of the stainless steel elements and the neutron poison are characteristic of the remaining cell embodiments disclosed herein and need not be repeated.

If desired, holes 114 can be provided in portions 110 in order to permit visual confirmation that sheets 112 are present and to facilitate the escape of borated water when cask 38 is drained. During drainage the temperature within cask 38 rises to the boiling temperature of the borated water, so that a prolonged drying time is not required.

With continuing reference to FIG. 6, panel portions 106 include projections 116 which extend beyond grid basket assembly 42 when portions 106 are installed. The projections 116 are bent to provide flanges 118.

Figure 7:
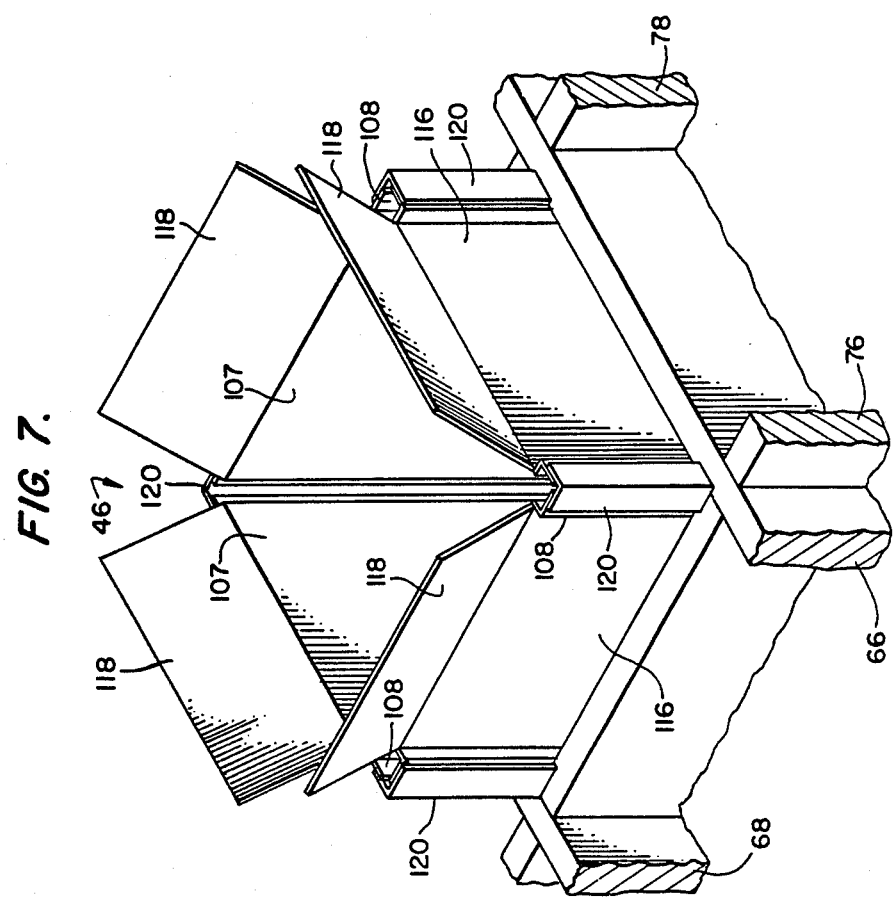
FIG. 7 is a perspective view of the top of the cell embodiment of FIG. 5.

Turning now to FIG. 7, brace elements 120 are welded to the projections 116 in order to support the portion of cell 46 that extend beyond grid basket assembly 42. It will be apparent from FIG. 7 that flanges 118 provide a funnel to guide fuel assemblies 20 into the cell 46 as cask 38 is being loaded.

Figure 8:
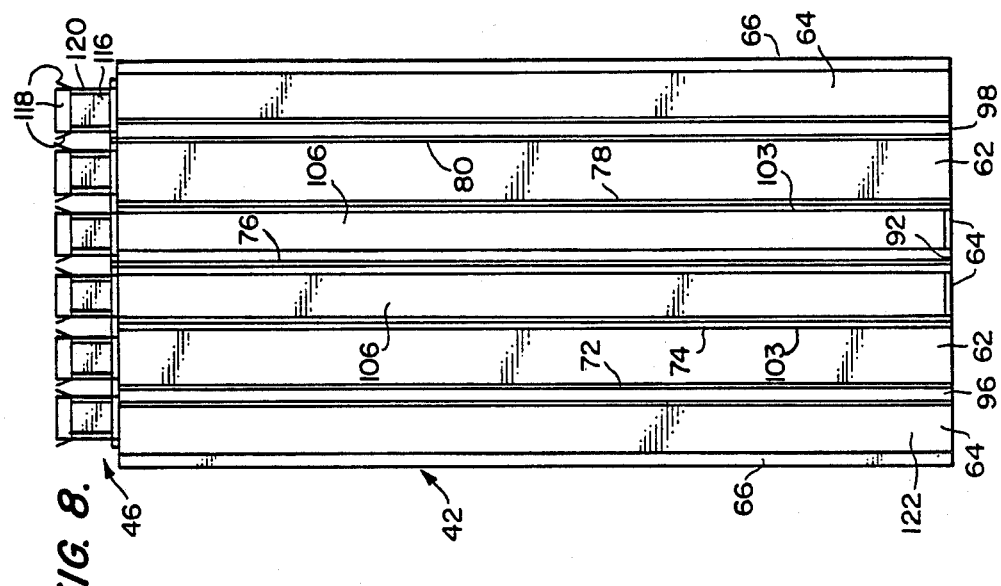
FIG. 8 is a front elevational view of the grid basket assembly with cells of the embodiment of FIG. 5 installed.

FIG. 8 illustrates cells 46 installed in grid basket assembly 42. Cells 46 are mechanically attached to grid basket assembly 42 only at lower portion 122 of assembly 42, so that the upper portions of assembly 42 and cells 46 may move with respect to each other in order to accommodate differences in the thermal coefficients of expansion between cells 46 and assembly 42. Differential expansion between grid 42 and cells 46 may amount two or more centimeters within the range of temperatures encountered during operation of cask 38. It will be noted from FIG. 8 that panel portions 106, without poison sheets 112 and wrapper portions 110, provide one wall of each of the two cells 46 between plates 74, 78 and 62. The reason for this is that the cell walls lie at the periphery of assembly 42 and consequently neutrons that are generated within these cells and that travel directly to container 40 need not be moderated in order to avoid a critical mass. In a similar manner, the outer wall of the cells 46 bounded by plates 64, 68 and 72, the outer walls of the cells 46 bounded leg plates 74, 78 and 70, and the outer wall of the cells 46 bounded by plates 64, 68 and 80, can be provided by panel portions 106 without wrapper portions 110 and sheets 112 of neutron poison.

Figure 10:
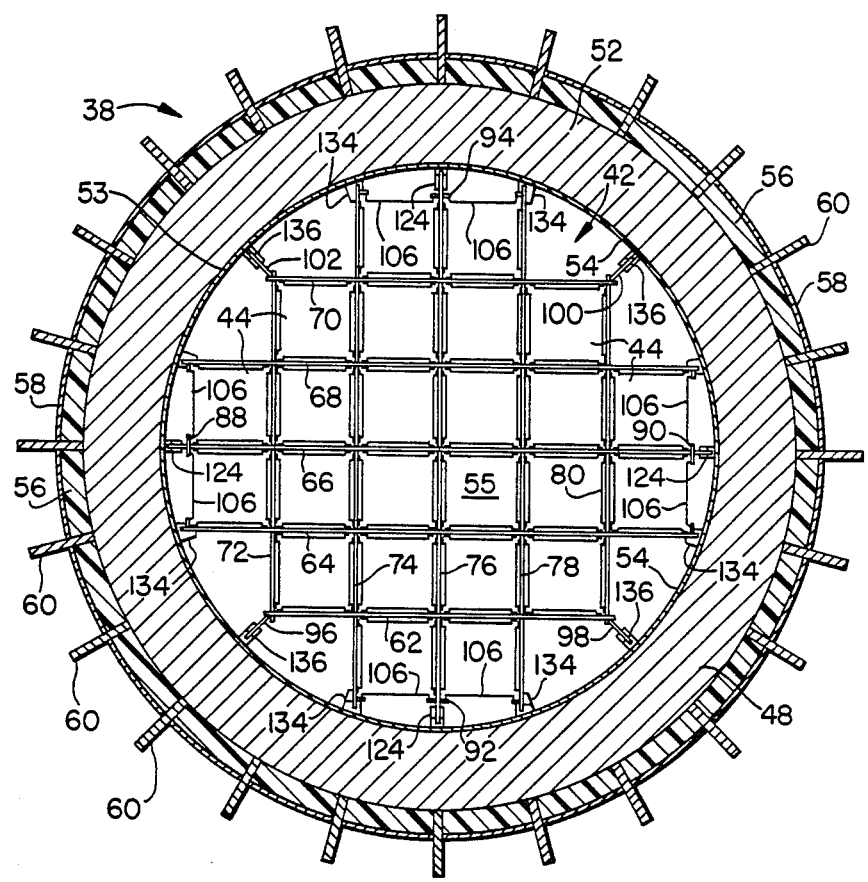
FIG. 10 is a sectional view, taken along a plane at right angles to the paper of FIG. 9, illustrating a storage cask with a grid basket assembly containing cells of the embodiment of FIG. 5.

FIG. 10 illustrates grid basket assembly 42, having cells 46 installed therein in order to provide storage slots 44 for receiving fuel assemblies 20, mounted within cask 38. In accordance with the present invention, cask 38 and grid basket assembly 42 are fabricated separately. Cells 46 are installed in grid basket assembly 42 (except for the eight cell walls at the periphery of assembly 42 which are formed by panel portions 106 alone, without portions 110 or sheets 112) and, before assembly 42 is inserted within cask 38, stainless steel channel sections (which will be described below) are fitted to the projecting ends of plates 64, 66, 68, 74, 76, 78 and 96, 98, 100 and 102. The portions of stainless steel cladding layer 54 which will receive the channel sections are machined to provide smooth surfaces, and then assembly 42 with the channel sections attached but not permanently joined thereto is inserted into cask 38. Full length fillet wells (preferably applied by a welding robot) are then used to permanently attach the channel sections to cask 38, following which the eight peripheral cell walls formed by panel portions 106 alone are installed. Installation of these eight peripheral cell walls is delayed in this manner in order to permit space for welding the channel sections. It should be noted that welding the channel sections after grid basket assembly 42 is installed, rather than before, avoids the possibility that assembly 42 might "hang up" while partially installed due to the close tolerances involved.

Figure 11:
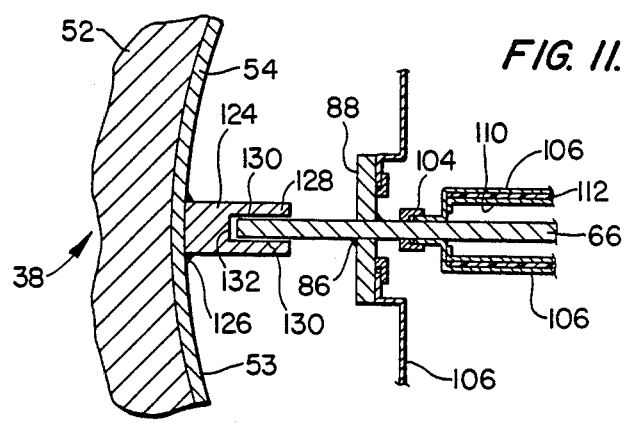
FIG. 11 is a detailed view showing one of the channel sections illustrated in FIG. 10 cooperating with the edge of a plate of the grid basket assembly.

Turning now to FIGS. 11, 12 and 13, the coupling of grid basket assembly 42 to cask 38 by way of channel sections will now be described in more detail. These Figures illustrate only three such couplings, but it will be understood that a total of 16 connections are actually present, each of these couplings being accomplished in accordance with one of FIGS. 11–13.

In FIG. 11, an elongated channel section 124 is attached via full length fillet welds 126 to the wall 53 of cask 38. Channel section 124 has a generally U-shaped channel 128 which is slightly wider than the thickness of plate 66, thereby providing narrow gaps 130, which are perhaps 0.025–0.05 cm wide if the gaps 130 are equal on each side. However, gaps 130 need not be symmetrical, and no adverse consequences arise if plate 66 contacts one side of channel 128. Before cask 38 is sealed, it is preferably flooded with an inert gas, such as helium, which transmits heat well through narrow gaps. However, other insert gases such as nitrogen can be used and, moreover, caks performance is acceptable with air. There is also a space 132 at the end of channel 128, thereby permitting section 124 to accommodate variations in the dimensions of plate 66 due to differential expansion of cask 38 and assembly 42 at differential temperatures.

FIG. 12 illustrates an elongated channel section 134 welded to the inner wall 53 of cask 38 in order to accommodate an edge of plate 64, and FIG. 13 illustrates an elongated channel section 136 welded to the inner wall 53 of cask 38 in order to accommodate plate 96. As was the case in FIG. 11, there are narrow gaps 130 between the plates and the channel sections, these narrow gaps producing little hindrance to heat transfer, particularly in a helium atmosphere, and spaces 132 to accommodate differential expansion of the elements.

It is desirable to elevate grid assembly 42 above the floor 55 of cask 38 in order to facilitate the removal of borated water when spent fuel is being prepared for storage in the cask. In order to achieve this elevation, FIG. 14 illustrates the lower portion 138 of channel section 124 as being solid in order to elevate plate 66. The lower portions of the remaining channel sections are, of course, configured in a similar manner. Alternatively, the plates of grid basket assembly 42 may be provided with drainage cut-outs. FIG. 15 illustrates plates 140 and 142, corresponding to plates 66 and 76 of FIG. 4, respectively, with drainage cut-outs 143.

Figure 16:
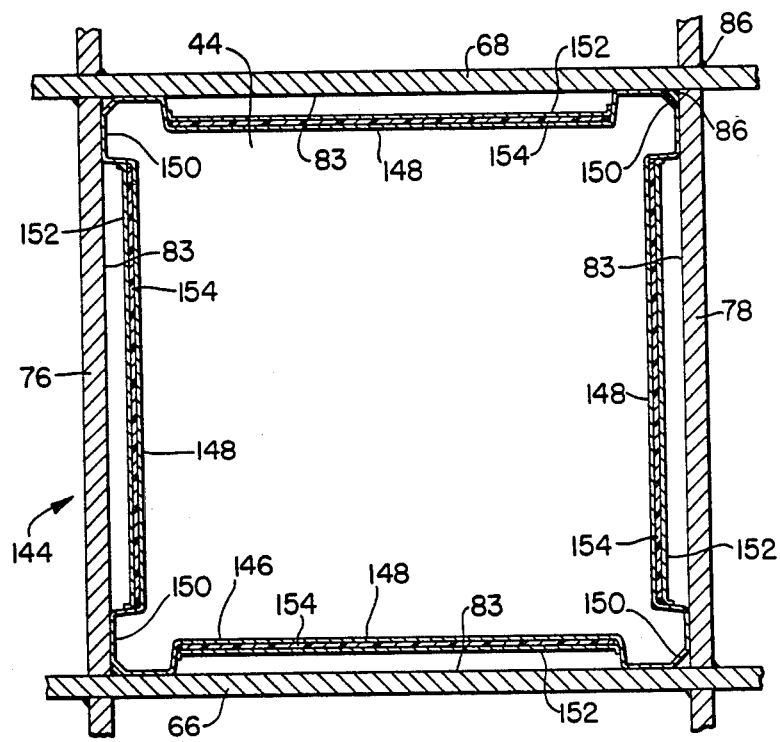
FIG. 16 is a sectional view, taken along a plane parallel to the surface of the paper of FIG. 3, showing a storage slot of grid basket assembly and a second embodiment of a cell.
Figure 17:
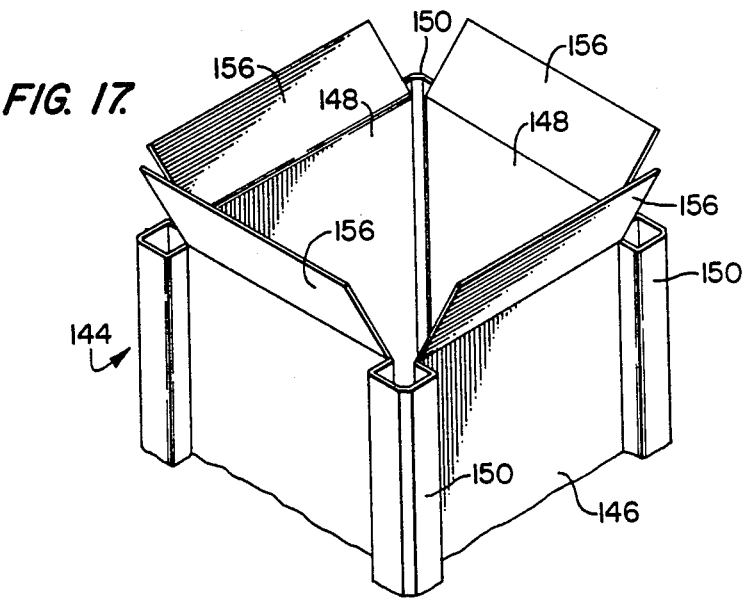
FIG. 17 is a perspective view of the top portion of the cell of FIG. 16.

A further cell embodiment is illustrated in FIGS. 16 and 17. Unlike the previous embodiment, the embodiment of FIGS. 16 and 17 does not require tabs 104. This is advantageous because the usable space in the storage slot 44 is effectively enlarged, so that the same grid basket assembly 42 which is used for storage of fuel assemblies 20 can, alternatively, be employed to store fuel in consolidated form. Use of cask 38 for consolidated storage will be discussed subsequently.

With reference to FIGS. 16 and 17, cell 144 includes a hollow stainless steel shell element 146 having wall portions 148 joined by corner portions 150. As in other cell embodiments, the particular fuel assembly to be stored in cell 144 determines the cross-sectional area defined by wall portions 148. Corner portions 150 contact grid assembly 42 adjacent the intersections of the plates thereof. Four stainless wrapper portions 152 are welded to shell element 146 between corner portions 150 in order to support neutron poison sheets 154. If desired, wrapper portions 152 may having openings to facilitate drainage of borated water and to permit verification that sheets 154 are present. In the embodiment of FIGS. 16 and 17, brace elements 120 are unnecessary in order to support the portion of cell 144 that extends above grid assembly 42, since support in this region is provided by corner portions 150. However, the upper ends of wall portions 148 are bent outward to provide flanges 156 to act as funnels for guiding a fuel assembly 26 into the cell. As was the case with the previous embodiment, the cells 144 can be attached to grid assembly 42 at bottom end 122 thereof in order to permit differential expansion of the cells 144 with respect to assembly 42 at different temperatures.

However, differential expansion is still permitted if, instead of affixing cells 144 to grid assembly 42, the cell bottoms are allowed to rest directly on floor 55 (in which case drainage cut-outs, similar to cut-outs 143 in FIG. 15, should be provided). This alternative is, of course, advantageous, since the cells 144 would not have to be installed in assembly 42 before assembly 42 is inserted in container 40, so that it would be unnecessary to dedicate cask 38 at the time of manufacture to the storage of fuel assemblies 20 having particular dimensions. Cells 144 having interior dimensions appropriate for particular fuel assemblies 20 can be installed after cask 38 is manufactured, or cells can be omitted entirely if fuel is to be stored in consolidated form, as will be discussed subsequently. Thus, cask 38 need not be tailored to a particular storage application, a factor which contributes significantly to the versatility of the cask.

For the sake of convenience, cells which can readily be installed in cask 38 after it is fabricated, or removed from cask 38 after storage of fuel assemblies 20 so that cask 38 can be prepared to receive fuel in consolidated form, will be deeded "removable" cells. It will be apparent that cells 144 are removable cells, unless they are permanently installed in assembly 42 at the time of manufacture, since they can readily be slid into or out of storage slots 44.

Turning next to FIGS. 18 and 19, another removable cell embodiment, one having spacer elements on the walls of the cell in order to center the cell within a storage slot 44, will now be discussed. In these Figures cell 158 includes a four-sided stainless steel shell element 160 whose upper end is provided with flanges 161 to funnel the fuel assembly 20 into the cell. Stainless steel wrapper portions 162 are welded to element 160 in order to support neutron poison sheets 166 between element 160 and portion 162. The spacer elements in this embodiment are provided by dimpled portions 168 in shell element 160 adjacent the upper end thereof and dimpled portions 170 positioned at various heights along wrapper portions 162. The bottom end of cell 158 can be bolted or welded to the lower end 122 of grid basket assembly 42 in the manner previously described or it may simply rest upon a support element as illustrated in FIGS. 22 and 23.

Figure 22:
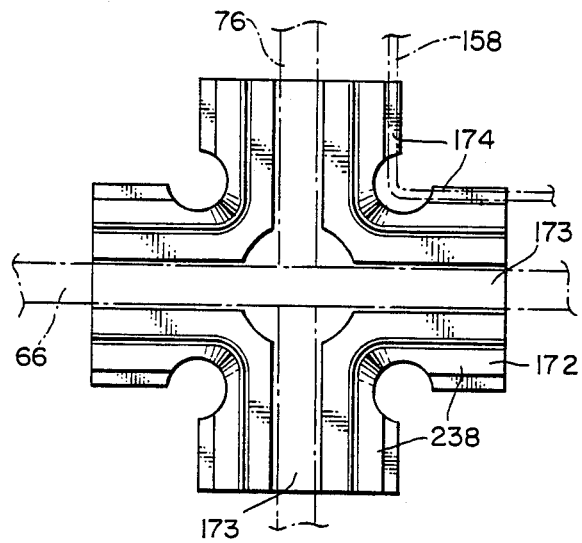
FIG. 22 is a top plan view of a support element which can be used to elevate the grid assembly above the floor of the cask and either support the bottom of a cell or permit the bottom of a consolidation canister to rest on the cask floor.
Figure 23:
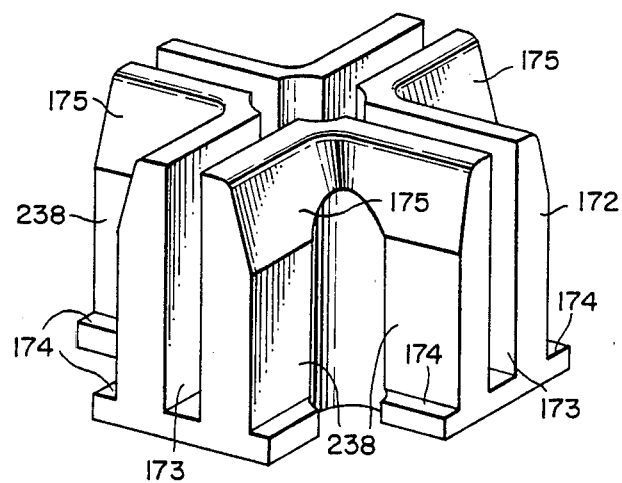
FIG. 23 is a perspective view of the support element of FIG. 22.

In FIGS. 22 and 23, a stainless steel support element 172 is provided with intersecting channels 173 to accommodate the bottoms of the plates of grid basket assembly 42. In FIG. 22, plates 66 and 76 are supported at their intersection, and it will be apparent that the other plate intersections are also provided with support. Elements 72 are welded to grid assembly 42 but not to the floor 55 of cask 38, thereby supporting grid 42 above the floor of cask 38 in order to facilitate the drainage of borated water from cask 38 when spent fuel is being loaded while nevertheless permitting differential expansion of cask 38 with respect to grid basket assembly 42. Support elements 172 are provided with flanges 174 against which the lower ends of cells 158 rest after they are inserted into storage slots 44 and with sloping walls 175 to center the cells and guide the lower ends towards flanges 174 as they are being inserted. In this way, dimpled portions 168, dimpled portions 170, and flanges 174 properly position the cells 158 within grid basket assembly 42 without bolting, welding, or clamping.

The embodiment of FIG. 20 is similar to that of FIGS. 18 and 19 except that dimpled portions 168 are replaced by spacer members 176 that are welded to shell element 178. Although not illustrated in FIG. 20, spacer members are also welded to stainless steel wrapper portions 179. The thickness of members 176 is, of course, greater than the thickness of the members welded to wrapper portions 178 so as to facilitate assembly of the cells into the grid basket assembly 42 while also providing lateral support of the cells.

Unlike the embodiments of FIGS. 18-20, the removable cell embodiment of FIG. 21 does not rest upon support elements 172 or upon floor 55. Instead, stainless steel spacer member 180 having a hooked portion 182 is welded to stainless steel shell element 184. Member 180 not only spaces the cell away from the slot walls 83, in the manner of member 176 in the embodiment of FIG. 20, it also supports the cell adjacent the top thereof so that the cell hangs from the top rather than being supported from the bottom. It will be apparent that this arrangement, like the previous embodiments, accommodates differential expansion of the cell with respect to grid basket assembly 42. Although not illustrated in FIG. 21, spacing members are also welded to stainless steel wrapper element 186, which supports sheet 188 of a neutron poison such as boron carbide.

Figure 24:
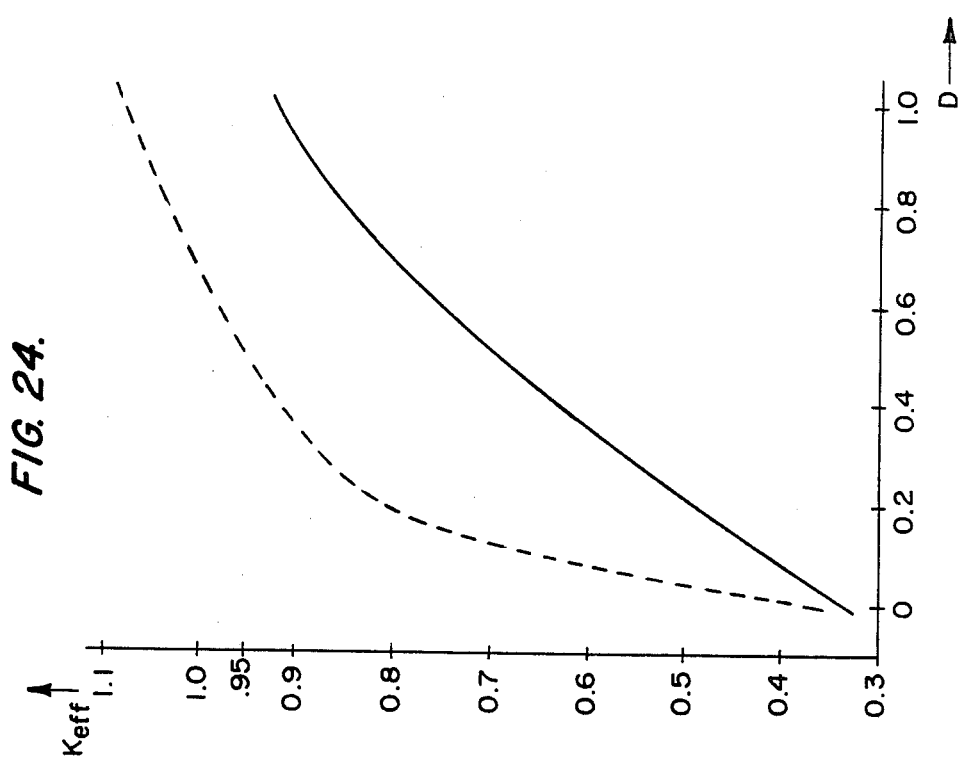
FIG. 24 is a "worst case" graph illustrating the neutron multiplication or criticality factor $K_{eff}$ as a function of water density when the cask of the present invention is fully loaded with fuel assemblies and is flooded with fresh water rather than borated water, the solid curve showing $K_{eff}$ when neutron poison is present in the cell walls and the dotted curve showing $K_{eff}$ if neutron poison were not present in the cell walls.

When cask 38 is loaded entirely with fuel assemblies 20, the cell embodiments previously described prevent a self-sustaining reaction before the borated water is drained both by supporting neutron poison and by positioning the fuel assemblies 20 in storage slots 44 provided by grid basket assembly 42 in order to ensure that fuel assemblies 20 are adequately spaced apart. These factors are sufficient to prevent criticality even under anomalous conditions. FIG. 24 is a graph of the criticality or neutron multiplication $K_{eff}$, assuming an anomalous condition, within a cask 38 that has been fully loaded with 24 fuel assemblies 20 following storage in pool 30 of borated water for approximately ten years, each of the fuel assemblies 20 having an array of $15 \times 15$ fuel rods 26. The anomalous condition which is assumed in FIG. 24 is that fresh, or non-borated, water is introduced into cask 38. In FIG. 24 the abscissa indicates fresh water density D in grams/cm$^3$, that is, the mass of the liquid water and water vapor in cask 38 divided by the total volume of liquid which can be contained by the cask. It will be apparent that a density of 1.0 gm/cc indicates that the cask is fully flooded with fresh water, and $K_{eff}$ is highest under this condition both for the cells disclosed herein (solid curve) and for cells which lack neutron poison (dotted curve). It will be noted that the solid curve lies below $K_{eff}=0.95$ even at maximum fresh water density. Moreover, as indicated by the dotted curve, $K_{eff}$ would remain less than 1.0, until cask 38 is over half full of fresh water, even if neutron poison were omitted from all the cells. Particularly if the wrapper portions have openings through which the presence of neutron poison can be visually confirmed, this possibility is extremely remote and does not present a creditable condition for evaluating the performance of cask 38. Moreover, if all of the cells were to lack poison sheets but the cask were to be flooded with borated water rather than fresh water, the maximum $K_{eff}$ would be approximately 0.83. Thus, $K_{eff}$ remains below 0.95 under one anomalous condition (cask flooded with fresh water) or another (all poison sheets absent), and only the theoretical possibility that both anomalous conditions might, somehow, occur simultaneously, would result in criticality. Of course, the only water which should ever find its way into cask 38 is borated and the opportunity for visual inspection would ensure that the cells are adequately provided with poison sheets. With poison sheets, $K_{eff}$ reaches approximately 0.74 when cask 38 is flooded with borated water.

It is generally recognized in the art that $K_{eff}$ is higher when fuel assemblies are stored than when fuel is stored in consolidated form under conditions that are otherwise identical. The reason for this is that water slows or "thermalizes" neutrons, thereby increasing the probability of a fissionable reaction, and that fuel which is packed tightly effectively removes space which would otherwise be available for water. Accordingly $K_{eff}$ within cask 38 remains below 0.95 if some or all of the storage slots 44 are used for consolidated storage.

As in known in the art, in consolidated storage the fuel rods 26 are removed from the fuel assemblies 20 and placed in a consolidated canister which holds a greater number of fuel rods than the number in a single fuel assembly. The nozzles 22 and 24, along with other non-fuel portions of the fuel assemblies 20, such as grid members 28, can then be stored separately in a low-level storage facility.

Figure 25:
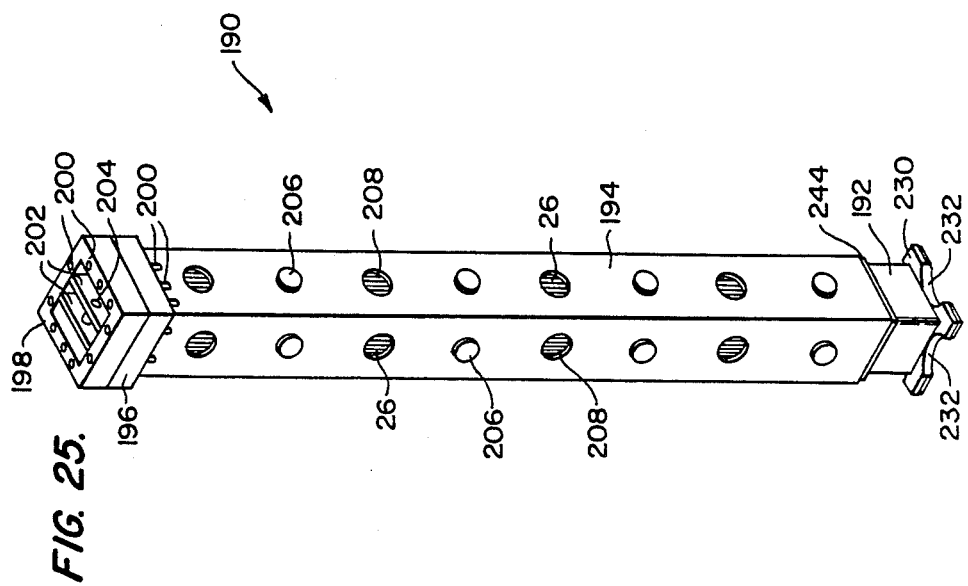
FIG. 25 is a perspective view of a consolidation canister for storing spent fuel rods which have been removed from fuel assemblies.

FIG. 25 illustrates a stainless steel consolidation canister which is filled with spent fuel. Canister 190 includes a base portion 192, a hollow body portion 194 having a collar 196 at the upper end thereof, and a lid portion 198 which is affixed by screws 200 to collar 196 in order to close canister 190. Bars 202 are welded to lid portion 198 to support rod 204. Rod 204 is present in order to accept a hook (not illustrated) for hoisting canister 190 into cask 38 after canister 190 is loaded with spent fuel. Both the loading and hoisting, of course, are accomplished by remote control.

With continuing reference to FIG. 25, the exterior of body portion 194 is provided with projections 206 which contact the walls of a storage slot 44 when canister 190 is inserted in cask 38 in order to provide lateral support for canister 190 within cask 38. Body portion 194 is also provided with openings 208 to permit passage of borated water. In FIG. 25, fuel rods 26 can be seen through openings 208.

Figure 27:
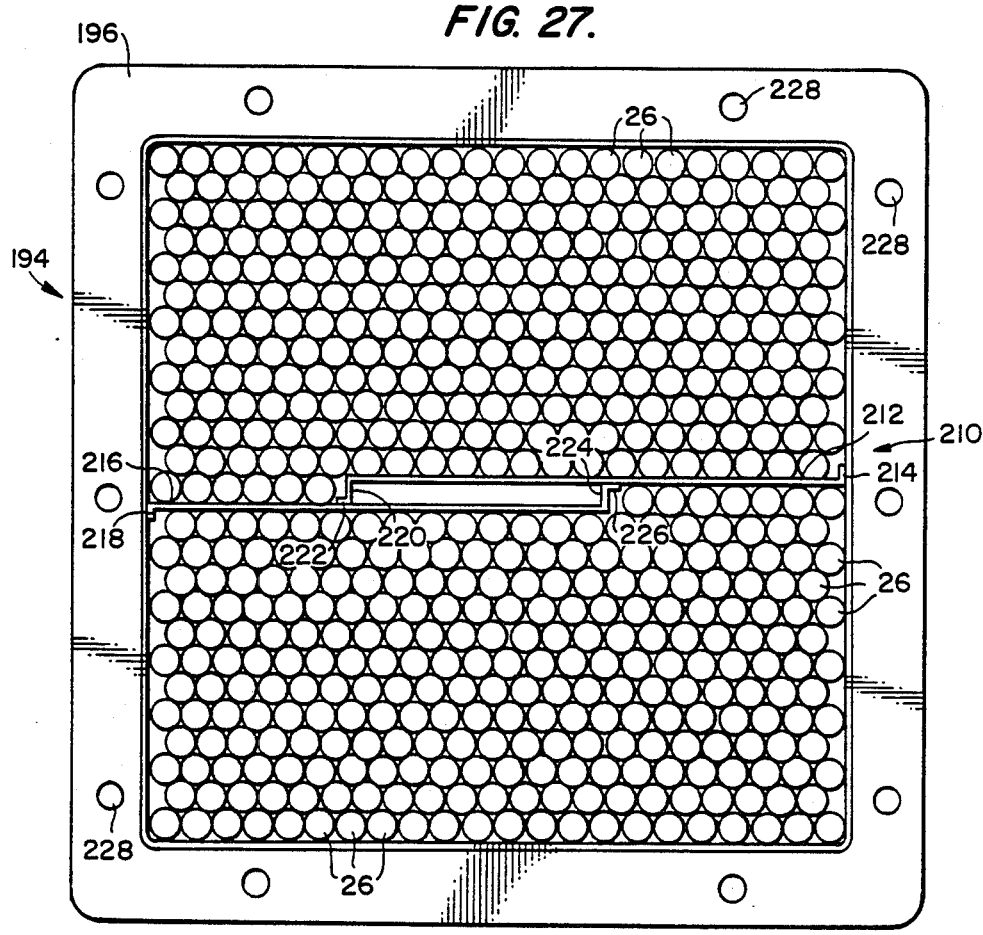
FIG. 27 is a top view of the body portion of the consolidation canister of FIG. 25 when it is fully loaded with spent fuel rods.

FIG. 27 illustrates the upper end of body portion 194 after it has been filled with the spent fuel rods 26 that have been removed from two fuel assemblies 20. Divider 210 is provided as part of body portion 194 and includes a stainless steel plate 212 having a flange 214 that is welded to one side of portion 194 and another plate 216 having a flange 218 that is welded to the other side of portion 194. On the side of plate 212 opposite flange 214 is a leg 220 terminating in a flange 222 that is welded to plate 216. In a similar manner, leg 224 of plate 216 has a flange 226 which is welded to plate 212.

With continuing reference to FIG. 27, the rods 26 from one fuel assembly 20 are inserted on one side of divider 210 and the rods 26 from another fuel assembly are inserted on the other side. Different fuel assembly designs, however, have different numbers of rods, and divider 210 permits the canister 190 to be customized when it is manufactured in accordance with the design of the particular fuel assembly 20 whose rods 26 it will store. That is to say, it will be apparent that the space bounded by plate 212, leg 220, plate 216 and leg 224 can readily be adjusted during fabrication of canister 190 in order to provide a snug fit for the fuel rods 26 that canister 190 is to receive.

With continuing reference to FIG. 27, threaded bores 228 through collar 196 of portion 194 are provided for receiving screws 200 (FIG. 25) when lid portion 198 (FIG. 25) is attached.

Figure 26:
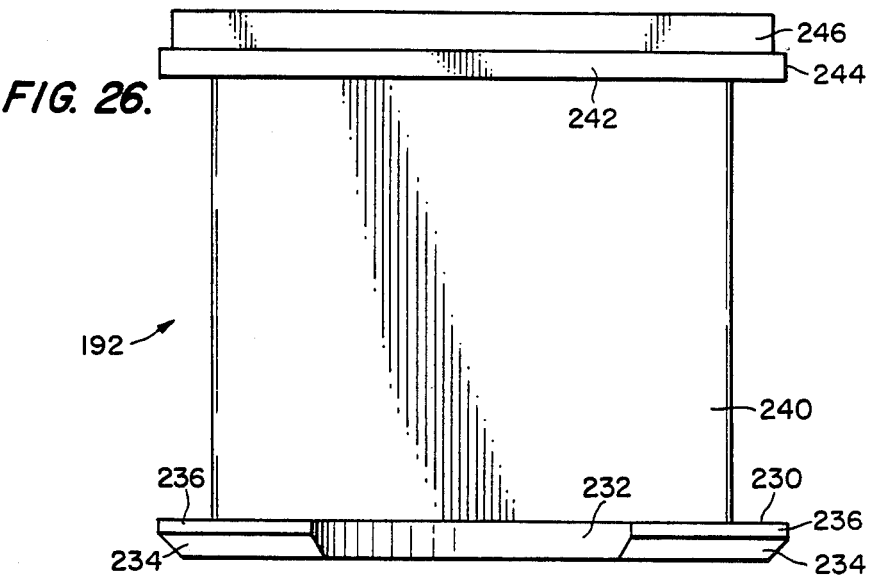
FIG. 26 is a side view of the energy-absorbing base portion of the consolidation canister of FIG. 25.

Turning next to FIG. 26, base portion 192 includes a foot plate 230 of stainless steel. The sides of plate 230 have hollowed regions 232 communicating with a passageway (not illustrated) through portion 192 in order to facilitate drainage of borated water from body portion 194. Plate 230 also has bevelled regions 234 at the bottom thereof. In the event that a canister 190 is used with a cask 38 having a grid basket assembly 42 that is supported by elements 172 (see FIGS. 22 and 23), the bevelled regions 234 of plate 230 overlap flanges 174 of elements 172 and permit plate 230 to rest securely on floor 55 of cask 38, with edges 236 of plate 230 being nestled against sides 238 of elements 172.

With continuing reference to FIG. 26, stainless steel support 240 is welded to plate 230. Support 240 is hollow and has walls which crumple in the event that canister 190 is accidentally dropped along its axis after it has been loaded with spent fuel; this crumpling absorbs energy which might otherwise rupture canister 190 during the accident. Stainless steel pedestal 242 is welded to support 240 and provides an outwardly extending rim 224 abutting the lower end of body portion 194. Platform portion 246 of pedestal 242 extends slightly into the interior of body portion 192 and supports the lower ends of fuel rods 26. Portion 246 provides another way to customize canisters 190 to the fuel rods 26 of particular fuel assembly designs. That is, platform portion 246 is manufactured to telescope further into body portion 194 if relatively short rods 26 are to be stored than if relatively long rods 26 are to be stored. Accordingly, it will be apparent to those skilled in the art that divider 210 and pedestal 242 permit canister 190 to be tailored during manufacture to the fuel rods of particular fuel assemblies 120. Thus, during manufacture, cask 38 need not be dedicated to either storage mode (that is, storage of intact fuel assemblies or storage of consolidated fuel) or to storage of spent fuel from any particular source (that is, spent fuel, either intact or consolidated, from any particular fuel assembly design). All that is necessary is that appropriately configured cells and/or consolidation canisters be present during the loading operation. Since both the cost and manufacturing lead time for cells and canisters are significantly less than for a storage cask, the versatility of cask 38 is expected to have considerable commercial significance.

A cask 38 can simultaneously store both consolidated fuel and intact fuel assemblies. Moreover, the storage mode may be changed after storage has begun. For example, if a cask 38 originally stores 24 fuel assemblies 26, it can be returned to pool 30 and opened, the fuel rods 26 can be removed from the fuel assemblies 20 and placed in consolidation canisters 190, and the cask 38 can then be re-loaded with more spent fuel than it originally stored.

Figure 28:
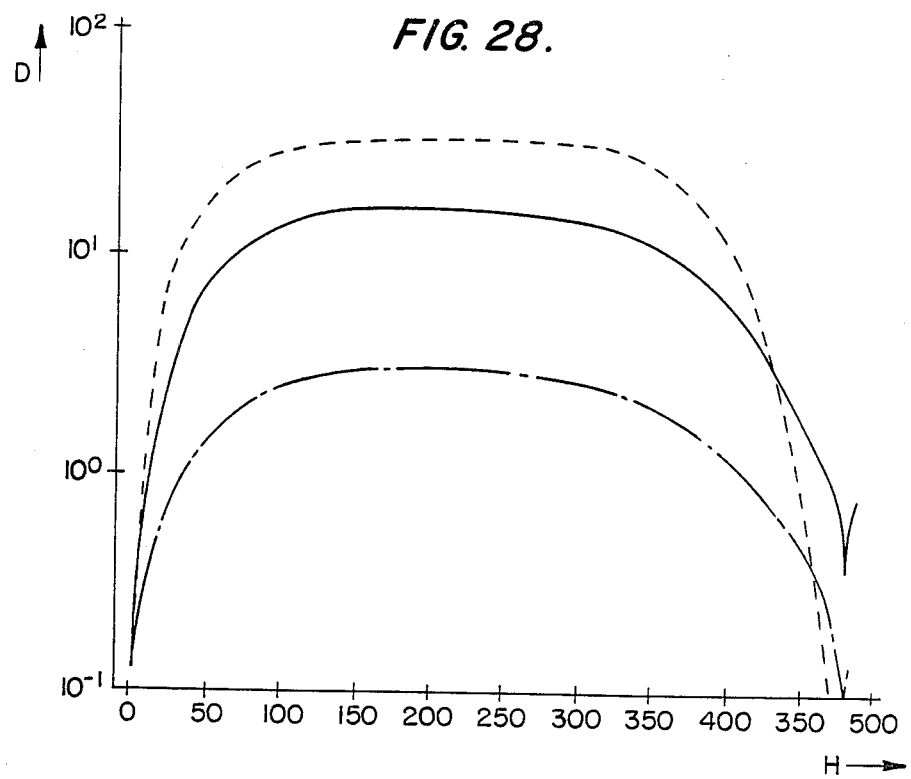
FIG. 28 is a graph of the dose rate D (in milliroentgen/hour) as a function of cask height H (in centimeters) at the external side surface of the cask of the present invention when it is fully loaded with fuel in consolidation canisters, with the solid curve showing the netruon dose rate, the dotted curve showing the primary gamma dose rate, and the dot-dash line showing the secondary gamma dose rate.
Figure 29:
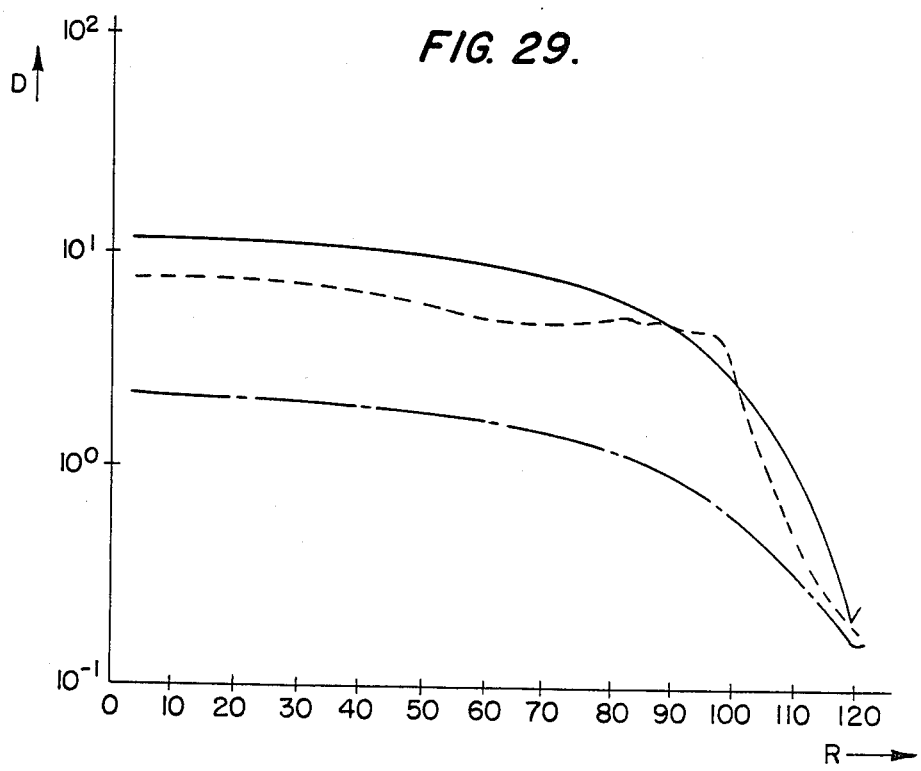
FIG. 29 is a graph of the dose rate D (in milliroentgen/hour), as a function of cask radius R (in centimeters from the cask axis) at the external bottom surface of the cask of the present invention when it is fully loaded with fuel in consolidation canisters, with the solid curve showing the neutron dose rate, the dotted curve showing the primary gamma dose rate, and the dot-dash curve showing the secondary gamma dose rate.

FIGS. 28 and 29 indicate the effectiveness of cask 38 in isolating spent fuel from the environment. In these Figures, it is assumed that all 24 storage slots 44 in cask 38 have been loaded with fuel in consolidated form, each canister 190 having 450 fuel rods 26 following storage thereof in borated water for approximately ten years. FIG. 28 illustrates the dose rate, in milliroentgen/hour, along the exterior surface of the sides of cask 38 between adjacent fins 60. As can be seen in FIG. 28, the dose rate D varies with the height H, in centimeters, above the bottom of the cask. Between heights of approximately 100 and 350 cm, the maximum neutron dose rate (solid curve) is less than 20 mrem/hr; the maximum primary gamma dose rate (that is, gamma rays from the interior of cask 38 which have passed through the cask walls) is less than 30 mrem/hr (dotted curve); and the maximum secondary gamma dose rate (gamma rays generated by neutron absorbing material 56 when neutrons are absorbed) is less than three mrem/hr (dot-dash curve). Accordingly, the maximum total dose rate at the side surface of cask 38 is less than 60 mrem/hr, and this dose rate falls rapidly with distance from the side surface. FIG. 29 illustrates the dose rate D, in milliroentgen/hour, at the external surface of the bottom of cask 38. The bottom might be exposed, for example, during transportation of cask 38 to a remote storage location. In FIG. 29, "R" indicates the distance in centimeters along the bottom surface from the axis of cask 38 to the side walls, and it will be seen that D drops rapidly as the side walls are approached. At the bottom surface, the maximum neutron dose rate (solid curve) is less than 15 mrem/hr; the maximum primary gamma dose rate (dotted curve) is less than 10 mrem/hr; and the maximum secondary gamma dose rate (dot-dash curve) is less than 2 mrem/hr.

From the foregoing description it will be apparent that the present invention provides a versatile and mechanically rugged spent fuel storage cask which reliably shields the environment from radiation produced by spend nuclear fuel stored therein despite temperature variations which arise during the loading of the fuel into the cask and long-term storage. Heat from fuel assemblies stored in the cells and/or fuel rods stored in consolidation canisters is transmitted by the grid assembly to channel sections affixed to the inner cask walls via narrow gaps between the U-shaped channels and the ends of the plates. The channel sections also provide space between the bottoms of the channels and the ends of the plates in order to accommodate radial movement of the grid basket assembly with respect to the cask as temperature changes. The various cell embodiments ensure tha a sustained nuclear reaction cannot occur as fuel assemblies are loaded into the cask and, moreover, several cell embodiments are disclosed which permit ready conversion of the cask and grid basket assembly for the storage of consolidated fuel.

Although the foregoing discussion has described the preferred embodiments of the invention with reference to pressurized water reactors, in which case the water in pool 30 would be borated, it will be apparent to those skilled in the art that the present invention could be used with spent fuel from a boiling water reactor.

It will be understood that the above description of the present invention is susceptible to various modifications, changes and adaptations, and the same are intended to be comprehended within the meaning and range of equivalents of the appended claims.

We claim:

1. A cask for long-term storage of spent nuclear fuel, comprising:

a container having a cavity therein, the cavity including a top portion, a bottom portion defining a floor, and metal side walls extending between the top and bottom portions;

a grid basket assembly within the cavity, said grid basket assembly including a plurality of metal plates joined together to provide a matrix of storage slots for accommodating the spent fuel, said plates having lower ends adjacent said floor;

container means disposed in said storage slots for enclosing spent nuclear fuel assemblies, said container means including elongated cells, each cell having four walls defining a generally rectangular cross section; and support elements disposed between the floor and the plates to support said plates above said floor, said support elements having flanges, and wherein at least one cell has a bottom that rests on said flanges.

2. The cask of claim 1, wherein the metal plates of said grid basket assembly are flat and are disposed substantially perpendicular to said floor in a pattern that provides elongated storage slots which have axes that are disposed at substantially right angles with respect to said floor and which have walls that provide substantially rectangular cross sections for the storage slots.

3. The cask of claim 1, wherein said cells are removable from said storage slots.

4. The cask of claim 1, wherein the spent nuclear fuel includes fuel rods that have been removed from fuel assemblies, and wherein said container means additionally includes elongated consolidation canisters, each said consolidation canister including an energy-absorbing base portion having a foot plate which rests on said floor and which has a bevelled region, a hollow body portion in which the fuel rods are disposed, and means for setting the volume within said hollow body portion available for fuel rods.

5. The cask of claim 1, wherein each cell comprises four elongated panel portions having sides terminating in flanges, a wrapper portion affixed to the panel portion between the flanges, and a sheet of neutron poison material disposed beween the wrapper portion and the panel portion, and further comprising a plurality of elongated tabs affixed to the walls of the storage slots at substantially right angles with respect to said floor, said flanges extending between the walls of the storage slots and portions of the tabs.

6. The cask of claim 1, wherein each cell comprises an elongated shell element having four wall portions that are spaced apart from the walls of the storage slots and four corner portions which contact the walls of the storage slots, four wrapper portions at least partially covering the wall portions and affixed to the corner portions, and four sheets of neutron poison material disposed between the wall portions and the wrapper portions.

7. The cask of claim 1, wherein each cell comprises an elongated shell element having a first side lying substantially in a first plane, second and third sides lying substantially in second and third planes, respectively, said second and third planes being spaced apart from one another and being substantially perpendicular to said first plane, and a fourth side lying substantially in a fourth plane that is spaced apart from said first plane and substantially perpendicular thereto, four wrapper portions affixed to the side portions and covering at least a part thereof, and four sheets of neutron poison material disposed between the wall portions and the wrapper portions.

8. The cask of claim 7, wherein each side has at least one dimple therein and wherein each wrapper portion has at least one dimple therein.

9. The cask of claim 7, further comprising at least one spacer member affixed to each side and at least one spacer member affixed to each wrapper portion.

10. The cask of claim 9, wherein the spacer members affixed to the sides include hook portion means for engaging the plates to support the cell.

11. The cask of claim 1, wherein at least one cell has a bottom that rests on said floor of said container.

12. The cask of claim 1, wherein at least two of said fuel assemblies have different dimensions and are disposed in cells whose walls define correspondingly different cross sections.

13. The cask of claim 1, wherein the spent nuclear fuel includes both spent fuel assemblies and fuel rods that have been removed from spent fuel assemblies, and wherein said spent fuel assemblies are enclosed in said cells and said container means further includes elongated consolidation canisters for enclosing the fuel rods.

14. The cask of claim 13, wherein at least two of said fuel assemblies have different dimensions and are disposed in cells whose walls define correspondingly different dimensions.

15. The cask of claim 1, wherein said grid basket assembly comprises a plurality of flat first metal plates positioned substantially parallel to one another at spaced apart positions, the first metal plates being substantially perpendicular to said floor, and a plurality of flat second metal plates positioned substantially parallel to one another at spaced apart positions, said second metal plates being substantially perpendicular to said floor and to said first metal plates, each of said first and second metal plates having elongated slots therein which are substantially perpendicular to said floor, the elongated slots of the first metal plates being inserted into the elongated slots of the second metal plates to provide a plurality of elongated storage slots having axes that are substantially perpendicular to said floor and having substantially square cross sections.

16. The cask of claim 15, wherein said channel means comprises a plurality of elongated channel sections affixed to said side walls, each channel section being positioned adjacent a corresponding edge of a plate and having a generally U-shaped channel into which said corresponding edge movably extends.

17. The cask of claim 16, wherein said channel sections are welded to said side walls.

18. The cask of claim 1, wherein said plates of said grid basket assembly are vertically disposed and have edges, and further comprising means for transferring heat from said grid basket assembly to said side walls of said container while permitting movement of said grid basket assembly with respect to said side walls in response to temperature changes, said means including channel means affixed to said side walls for providing a plurality of generally U-shaped channels that are positioned adjacent said side walls, said channels being elongated and vertically disposed, the edges of said plates movably extending into said channels.

19. A cask for long-term storage of spent nuclear fuel, comprising:
a container having a cavity therein, the cavity including a top portion, a bottom portion defining a floor, and metal side walls extending between the top and bottom portions;
a grid basket assembly within the cavity, said grid basket assembly including a plurality of metal plates joined together to provide a matrix of storage slots for accommodating the spent fuel, said plates providing walls for said storage slots;
a plurality of elongated tabs affixed to the walls of a storage slot at substantially right angles with respect to said floor; and
container means disposed in the storage slots with the tabs for enclosing a spent nuclear fuel assembly, said container means including an elongated cell having four walls defining a generally rectangular cross section, said cell including
four elongated panel portions having sides terminating in flanges, said flanges extending between the walls of the respective storage slot and portions of the tabs,
a wrapper portion affixed to the panel portion between the flanges, and
a sheet of neutron poison material disposed between the wrapper portion and the panel portion.

20. The cask of claim 19, wherein the plates of said grid basket assembly are vertically disposed and have edges, and further comprising means for transferring heat from said grid basket assembly to said side walls while permitting movement of said grid basket assembly with respect to said side walls in response to temperature changes, said means including channel means affixed to said side walls for providing a plurality of generally U-shaped channels that are positioned adjacent said side walls, said channels being elongated and vertically disposed, the edges of said plates movably extending into said channels.

21. A cask for long-term storage of spent nuclear fuel, comprising:
a container having a cavity therein, the cavity including a top portion, a bottom portion defining a floor, and metal side walls extending between the top and bottom portions;
a grid basket assembly within the cavity, said grid basket assembly including a plurality of metal plates joined together to provide a matrix of storage slots for accommodating the spent fuel, said plates providing walls for said storage slots; and
container means disposed in a storage slot for enclosing a spent nuclear fuel assembly, said container means including an elongated cell having four walls defining a generally rectangular cross section, said cell including
an elongated shell element having four wall portions that are spaced apart from the walls of the respective storage slot and four corner portions which contact the walls of the respective storage slot,
four wrapper portions at least partially covering the wall portions and affixed to the corner portions, and
four sheets of neutron poison material disposed between the wall portions and the wrapper portions.

22. The cask of claim 21, wherein said plates are vertically disposed and have edges, and further comprising means for transferring heat from said grid basket assembly to said side walls while permitting movement of said grid basket assembly with respect to said side walls in response to temperature changes, said means including channel means affixed to said side walls for providing a plurality of generally U-shaped channels that are positioned adjacent said side walls, said channels being elongated and vertically disposed, the edges of said plates movably extending into said channels.

23. A cask for long-term storage of spent nuclear fuel, comprising:
   a container having a cavity therein, the cavity including a top portion, a bottom portion defining a floor, and metal side walls extending between the top and bottom portions;
   a grid basket assembly within the cavity, said grid basket assembly including a plurality of metal plates joined together to provide a matrix of storage slots for accommodating the spent fuel; and
   container means disposed in said storage slots for enclosing a spent nuclear fuel assembly, said container means including an elongated cell having four walls defining a generally rectangular cross section, said cell including
      an elongated shell element having a first side lying substantially in a first plane, second and third sides lying substantially in second and third planes, respectively, said second and third planes being spaced apart from one another and being substantially perpendicular to said first plane, and a fourth side lying substantially in a fourth plane that is spaced apart from said first plane and substantially perpendicular thereto,
      four wrapper portions affixed to the side portions and covering at lest a part thereof, and
      four sheets of neutron poison material disposed between the wall portions and the wrapper portions.

24. The cask of claim 23, wherein each side has at least one dimple therein and wherein each wrapper portion has at least one dimple therein.

25. The cask of claim 23, further comprising at least one spacer member affixed to each side and at least one spacer member affixed to each wrapper portion.

26. The cask of claim 25, wherein the spacer members affixed to the sides include hook portion means for engaging the plates to support the cell.

27. The cask of claim 23, wherein said plates are vertically disposed and have edges, and further comprising means for transferring heat from said grid basket assembly to said side walls while permitting movement of said grid basket assembly with respect to said side walls in response to temperature changes, said means including channel means affixed to said side walls for providing a plurality of generally U-shaped channels that are positioned adjacent said side walls, said channels being elongated and vertically disposed, the edges of said plates movably extending into said channels.

* * * * *